H. H. CURTIS.
METERING PANEL.
APPLICATION FILED APR. 6, 1917.

1,265,998.

Patented May 14, 1918.
3 SHEETS—SHEET 1.

WITNESS:
B. F. Seaver.

INVENTOR,
Henry H. Curtis,
BY
Harry W. Bown.
ATTORNEY.

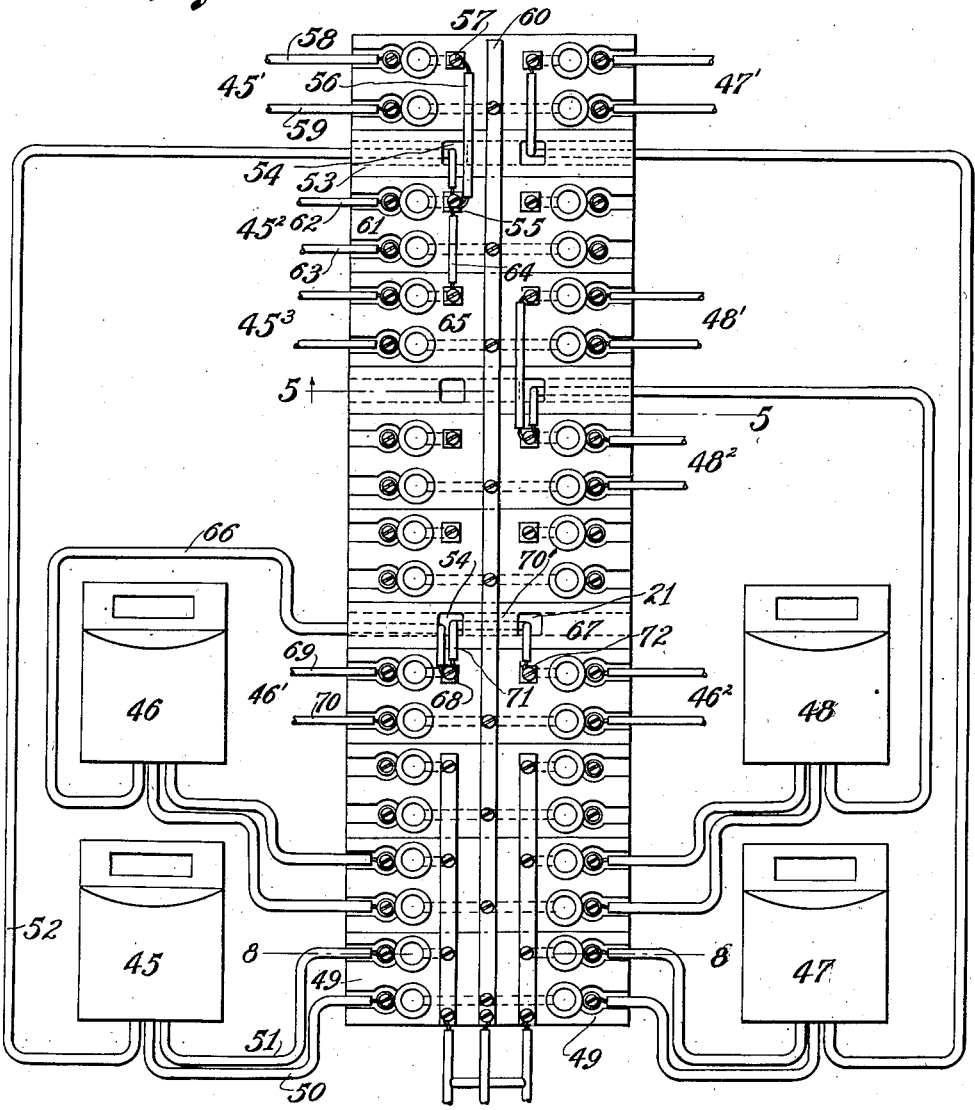

H. H. CURTIS.
METERING PANEL.
APPLICATION FILED APR. 6, 1917.
1,265,998.
Patented May 14, 1918.
3 SHEETS—SHEET 3.
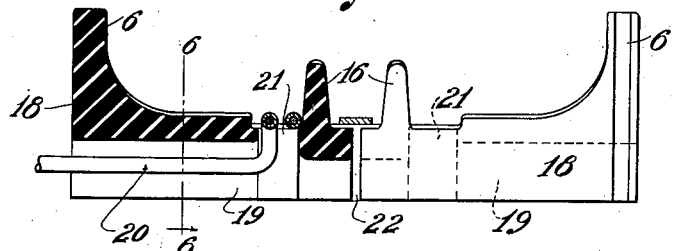
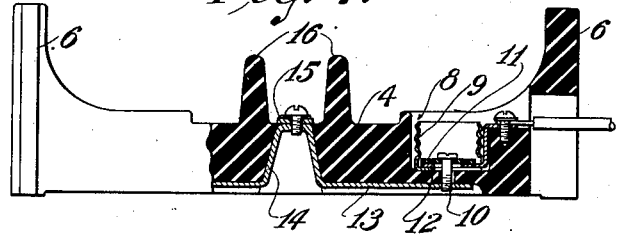
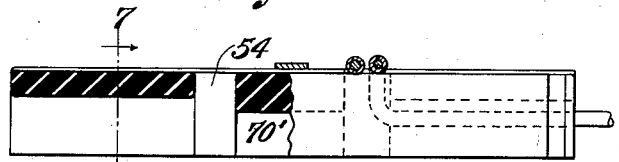
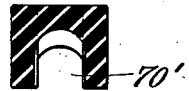
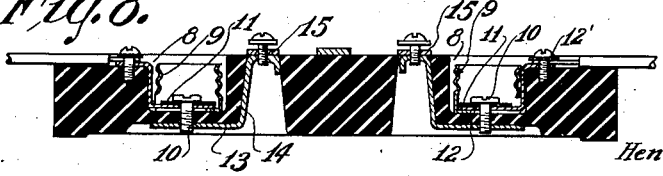
WITNESS:
B. A. Seaver.
INVENTOR,
Henry H. Curtis,
BY
Harry W. Bourn.
ATTORNEY.

UNITED STATES PATENT OFFICE.

HENRY H. CURTIS, OF SPRINGFIELD, MASSACHUSETTS, ASSIGNOR TO C. & P. ELECTRIC WORKS, OF SPRINGFIELD, MASSACHUSETTS, A VOLUNTARY ASSOCIATION.

METERING-PANEL.

1,265,998.   Specification of Letters Patent.   Patented May 14, 1918.

Application filed April 6, 1917. Serial No. 160,146.

*To all whom it may concern:*

Be it known that I, HENRY H. CURTIS, a citizen of the United States of America, residing in the city of Springfield, county of Hampden, and State of Massachusetts, have invented certain new and useful Improvements in Metering-Panels, of which the following is a specification.

This invention relates to improvements in electric metering panels and it has for its object the formation or building up of such a panel by assembling blocks or sections of insulating material. The arrangement of these sections is for the purpose of permitting a quick and convenient connection of various consumption circuits onto the same meter. Broadly considered, the invention comprises a series of sections or blocks arranged with smaller blocks or sections located adjacent a series of said sections to which branch or consumption circuits are connected, said smaller blocks being formed with longitudinal channel portions that are located in the axial line thereof and which terminate in an opening at the inner end of said channel that leads to the upper surface of the smaller blocks or sections, whereby the meter wires can be carried across the ends of all of the sections, next through the channels of the meter section and up through the openings leading from said channeled sections to the upper surface of the panel, where suitable connections can be made with the branch or consumption circuits, so that several consumption circuits may be connected to the same meter as desired.

A further object of the invention is to produce a metering panel in which the smaller or intermediately located channeled sections are used with the end barriers and center barrier portions thereon omitted. In this form the passageway around the ends of the blocks and between the sides of the panel and the ends of the sections is omitted.

Referring to the drawings:

Figure 1 is a plan view of the complete metering panel showing the arrangement or assemblage of a series of the fuse block sections with the smaller channeled blocks or sections located between the series for receiving the metering wires, so that several consumption circuits can be connected to the same meter, also showing the border or side portions of the panel box with the consumption, distribution and metering circuits located therein;

Fig. 2 is a view similar to Fig. 1, but showing the barrier or end portions of the fuse block sections omitted and the intermediately located channeled sections which carry the consumption circuits with the cabinet omitted;

Fig. 3 is a transverse view partly in section, taken in a plane on the section line 3—3 of Fig. 1, showing the longitudinally arranged channel in the lower part of the smaller sections through which the meter wires are drawn and which extend to the upper surface thereof, one end of the block or section being broken away to show the location of a meter wire therein;

Fig. 4 is a section taken in a plane on the line 4—4 of Fig. 1, showing in side elevation the construction of a fuse block section with barrier portions, part of it being shown in section to illustrate the fuse socket and a wire of a consumption circuit;

Fig. 5 is a sectional view taken in a plane on the broken line 5—5 of Fig. 2 showing one of the smaller channeled sections that is located between the fuse block sections which carry the consumption circuits and with the barrier or end portions removed;

Fig. 6 is a transverse sectional view on the line 6—6 of Fig. 3 looking in the direction of the arrow, showing the location of the channel in the lower side thereof and a meter wire extending upward to the upper surface;

Fig. 7 is a sectional view on the line 7—7 of Fig. 5 looking in the direction of the arrow and showing the barrier portions omitted;

Fig. 8 is a longitudinal sectional view on the line 8—8 of Fig. 2 showing the construction of one of the fuse-block sections used with the smaller channeled sections which receive the meter wires.

Figure 1:
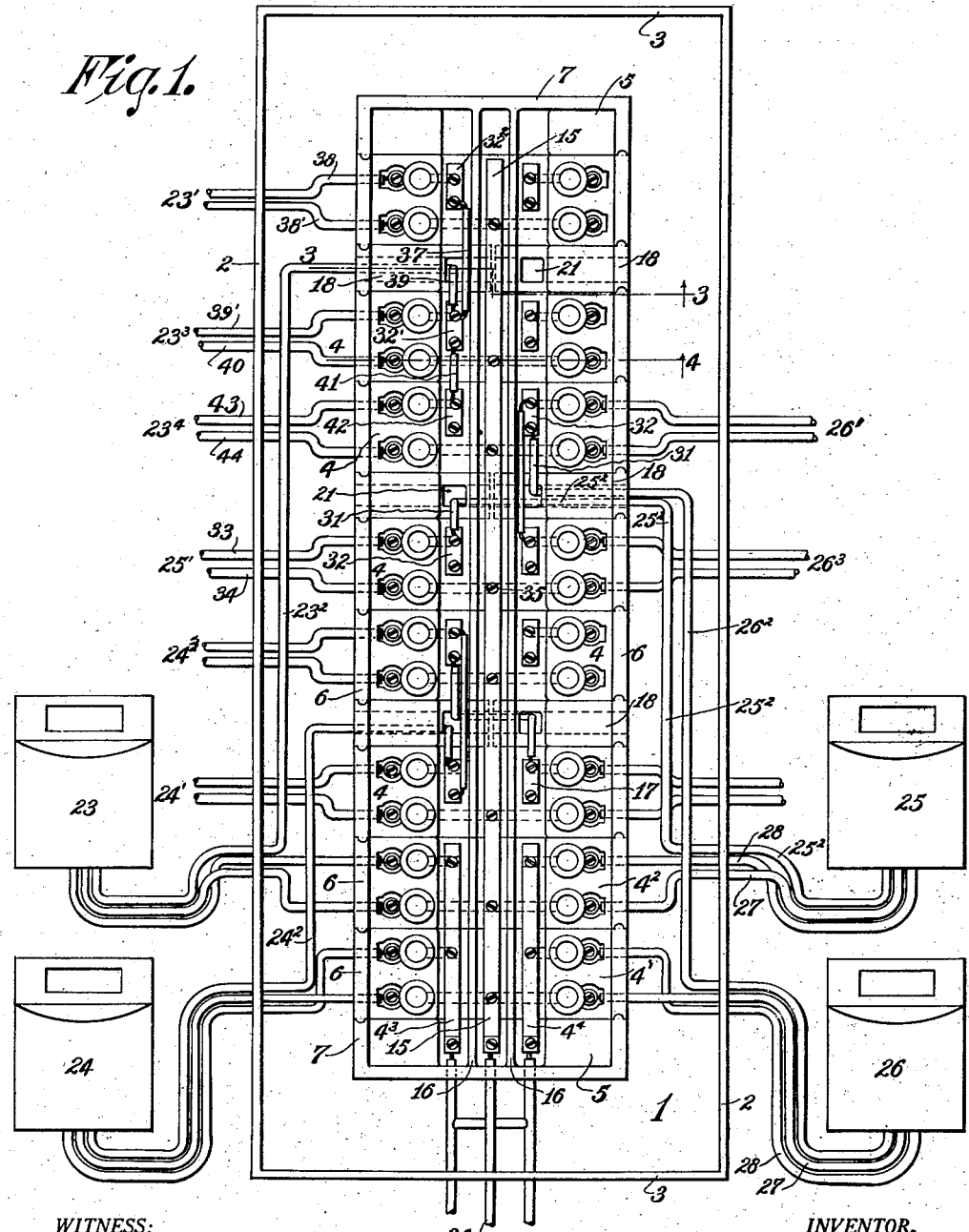

Referring to the drawings in detail: 1 designates the cabinet as a whole for receiving the panel, 2 and 3 the side and end portions, respectively, of the cabinet having the fuse blocks 4 and end blocks 5 secured to the bottom portion of the cabinet. These blocks are usually formed of molded materials, as porcelain, and are provided with the elevated or end barrier portions 6 and 7. The fuse blocks 4 are provided with the recesses 8 within which are located the threaded metallic sockets 9 which receive the usual fuse plugs. These sockets are secured to the blocks 4 by means of the screws 10, the heads of which engage the washers 11 of insulating material and below these washers are located another set of washers 12 which are made integral with the terminals 12' which forms an electrical connection with the sockets 9. The screws 10 are threaded into the contact strip 13, the center portion of which is bent upward, as shown at 14 and to which the bus-bar 15 is secured, that extends, as shown, the length of the assembled fuse-blocks and metering sections. It is located between the elevated or barrier portions 16. The fuse blocks 4 are also provided with short connecting or contact strips 17 to which one terminal of the various branch or consumption circuits is connected.

Located between or adjacent to a series or plurality of fuse block sections 4 are smaller sections 18 which may be termed metering sections a detail view of one form being shown in Fig. 3. These sections are formed with longitudinally extending channels or grooves 19 therein (see Fig. 6) and within which is located or arranged the metering wire 20. The inner ends of these channeled metering sections are formed with vertical openings 21 (see Fig. 3) which communicate with the channeled portions 19 and, through which the ends of the meter wires 20 extend, as shown in Fig. 6. These blocks are or may be made substantially one half of the width of the section blocks 4, their inner ends being adjacent each other, as shown in Fig. 3 at 22. They may, however, be made the same width as the fuse block sections and in one piece as the block 4, as shown in Fig. 5. A plurality of meters are used in connection with the fuse and channeled metering blocks, which meters are indicated in outline at 23, 24, 25 and 26. Meters 25 and 26 for example are shown connected to the short bus-bars 4³ and 4⁴, for example through the usual fuse-plugs in the two fuse blocks 4' and 4² that are inserted in the sockets 9 of the blocks 4' and 4², the sockets being connected, as shown, to the bus-bars 4³ and 4⁴ and 15. The potential wires to the meters are indicated at 27, and the feed wires at 28. As illustrating the use of my improvement, should it be desired to connect, say the meter 25, with the terminals of the branch consumption circuit wires 25' shown in Fig. 1, the wire 25² from the meter 25 passes or extends upward to one of the channeled metering section blocks 18 through the channel 19 thereof and up through the opening 21 where a connection is made by means of the end portion 31 to the contact strip 32 which strip is connected to the consumption wire 33 of a fuse block section 4. The other side of the consumption circuit is connected by means of the wire 34 to the bus-bar strip 15 at 35 which leads back to the power circuit 36. By using the channeled metering section 18 the meter 25 is readily connected to the consumption wires 33 and 34 which may be located in a different room or office either on the same or different floors of a building. In the same manner the meters 23, 24, and 26 may be connected to the terminals of consumption or work circuits, 23', 24' and 26', shown in Fig. 1 by means of the smaller channeled metering section blocks 18 which are located between a series of the fuse blocks 4 it being understood that the wires from these meters are connected to the work circuits 23', 24', 26' by means of the contact strips 32, 32' and connections as 39 and 41 therefrom to the work circuits.

As further illustrating the use of my metering panel let it be required to connect the meter 23 with the three branch or consumption circuits 23', 23³, 23⁴, shown at the left hand upper corner of Fig. 1. The wire 23² from the meter 23 leads to the metering section block 18, up through the opening 21, wire 39 to the contact strip 32', wire 37, to the contact strip 32² terminal wire 38 of the consumption circuit and wire 38' back to the bus-bar 15. Should it be desired to connect the consumption circuit 23³ to the meter 23, the wire 23² which has been carried to the metering section block 18 up through the opening 21, the portion 39 is connected to the contact section 32' which is connected to the terminals of the consumpiton wires 39' and 40 back to the bus-bar 15. If it is desired to connect the meter 23 to the consumption circuit 23⁴ the metering wire 23² is connected to the fuse block sections 4 by means of the wires 39, strip 32', wire 41, contact strip 42 to the wires of the consumption circuit 43 and 44. In this way it will be seen that the meter 23 can be readily connected by means of one of the channeled metering section blocks 18 to various consumption circuits, as 23', 23³ and 23⁴. These circuits can also be all connected to the same meter (23) by the means already referred to. In the same manner the meters 24 and 26 can be readily connected to the branch or consumption circuits 24', 24³, 26' and 26³, respectively, or the branch circuits 24', 24³ can be all connected together to the meter indicated at 24, or the branch circuits 26² or any consumption circuit can be connected to any meter as desired.

Referring now to the modified construction shown in Fig. 2 in which the fuse block sections and the metering sections are shown with the barrier end portions 6 and 16 removed (see Figs. 5 and 7). 45, 46, 47 and 48 represent a plurality of meters that are connected, as before, to the fuse blocks at the lower end of the panel which are in turn connected to the source of supply. The meter 45 is shown connected to the metering section block 49 by means of the potential and feed wires 50 and 51. Should it be desired to connect the meter 45 with any one or all of the three consumption circuits indicated at 45', 45², and 45³ the wire 52 from the meter passes through the channel in the metering section 53, the wire passing upward through the opening 54 is connected to the contact plate 55 from which the wire 56 extends to the contact plate 57 which is connected to the wire 58 of the consumption circuit 45' and the other wire 59 which is connected back to the bus-bar 60. If it is desired to connect the meter 45 with the consumption circuit 45² the meter wire 52 to the metering section 53 is connected to the terminal 55 on the fuse block 61 and through the consumption circuit 45² by means of the wires 62 and 63, back to the bus-bar 60. If it is desired to connect the consumption circuit 45³ connection is made to the meter wire 52 by means of the short wire 64 to the fuse block 65. It is also apparent that all three of the consumption circuits 45', 45², and 45³ may readily be connected to the meter 45 by means of the wires 56 and 64. If it is desired to connect the consumption circuit 46' to the meter 46 the wire 66 therefrom is carried to the metering section 67 through the opening 54 to the contact terminal 68, wires 69 and 70 of the consumption or work circuit. The connection from the meter 46 to the consumption circuit 46² is also readily traced out on this figure by means of the connections 66, plate 68, wire 71 (through the channel 70'), opening 21, contact 72'. It should be stated that the metering sections between or adjacent the fuse block sections are formed with a continuous passageway 70' therethrough, as shown in Fig. 5. The connections from the meters 47 and 48 to the consumption circuits 47', 48' and 48² is clearly indicated in this view.

It will be seen from this description that the fuse block sections 4 shown in Fig. 1 are arranged for connection to the branch or consumption circuits, and that the metering sections are arranged between or adjacent a series of fuse block sections whereby one meter can be readily connected to several widely separated branch or consumption circuits. The size of the panel can be built up as desired.

What I claim is:

1. In a panel board construction, the combination with a plurality of fuse-block sections arranged side by side, a metering section formed with a longitudinal opening therein, said section being located adjacent the fuse block sections, and the fuse block sections being connected to consumption circuits, a metering wire from the meter and located in the opening of the metering section and means including contact plates and wires on the fuse block sections for connecting the metering wire therein to one or more of the consumption circuits.

2. In a metering panel board construction, the combination with a plurality of fuse-block sections, a channeled metering section, a meter, a wire therefrom and passed through said channeled section, means for connecting any one or more of said fuse block sections to the meter for measuring the current consumed in a plurality of consumption circuits.

3. In a metering panel, the combination with a plurality of fuse-block sections arranged side by side and to which consumption circuits are connected, a single channeled metering section for said sections, a meter having a metering wire leading to the metering section and means for connecting a plurality of consumption circuits to the metering section, whereby one meter is employed for measuring the combined current in several consumption circuits.

4. A meter section or block for a metering panel, comprising a member formed with a channel or groove therein on the underside thereof extending its length and having a vertical opening communicating with the channel or groove near its inner end for receiving the metering wire.

5. In a panel board construction, the combination with a series of fuse-block sections arranged side by side to which consumption circuits are connected, a channeled metering section, said channel being designed to receive the wire from the meter and the metering section having an opening communicating with the channel portion through which the terminal of the meter wire passes, whereby connections therewith may be made to various fuse block sections, and whereby a meter may be connected to one or more of the consumption circuits.

6. A system of electrical distribution comprising supply circuits, fuse block sections, meter circuits and consumption circuits, a panel board having a channeled section therein for receiving a wire from the meter and means comprising plates and connecting wires between the fuse block sections and the channeled section for connecting the terminal of the meter wire where it leaves the channeled section to the various consumption circuits, as described.

7. In a metering panel the combination with a plurality of fuse-block sections to which consumption circuits are connected, a meter, a supply circuit connections to the meter, a channeled metering section for receiving a wire from the meter, and means for connecting the terminals of the meter wire to the various terminals of the fuse block sections, whereby the currents in different consumption circuits may be measured.

8. A system of electrical distribution comprising a meter and a supply circuit connected thereto, a plurality of fuse blocks to which a plurality of consumption circuits may be connected, a metering block formed with a single channeled portion through which a wire from the meter passes and connecting means between the wire in the metering section and a plurality of fuse-block members, whereby the same meter may be used for measuring the current in a plurality of consumption circuits, as described.

9. In a system of electrical distribution, a panel-board having meter and consumption circuits, a block on said panel-board having a channel in the under side thereof for receiving metering wires, as described, for connecting any one of the meters to several consumption circuits.

10. A metering panel for connecting a plurality of consumption circuits to a single electric meter and comprising a panel having a plurality of fuse-blocks to which the consumption circuits are connected, a single metering section formed with a channel therein and terminating in an opening which leads from the channel to the outer surface of the sections to receive a wire from the meter and to which wire the fuse-blocks are connected.

11. A metering-section for a metering panel comprising a block-like elongated structure having a continuous channel in its under side leading from its outer end surface inward toward its inner end and terminating in an opening extending to its upper surface for receiving a wire from a meter.

12. A metering panel for connecting a plurality of consumption circuits to a single metering instrument comprising a plurality of fuse blocks arranged side by side and to which the various consumption circuits are connected, means for connecting the fuse-blocks to the main circuits, a single meter section arranged at the side of one of said blocks and formed with a channel terminating in an opening to receive a wire from the meter and having its terminal extending through the opening, means including contact strips for connecting the terminal of the meter wire to said consumption circuits.

HENRY H. CURTIS.